US007979334B2

(12) United States Patent
Kochansky

(10) Patent No.: US 7,979,334 B2
(45) Date of Patent: Jul. 12, 2011

(54) SYSTEM AND METHOD FOR DETERMINING THE BUYING POWER OF AN INVESTMENT PORTFOLIO

(75) Inventor: Joseph Kochansky, Bronxville, NY (US)

(73) Assignee: Blackrock, Inc., New York, NY (US)

( * ) Notice: Subject to any disclaimer, the term of this patent is extended or adjusted under 35 U.S.C. 154(b) by 1172 days.

(21) Appl. No.: 10/657,535

(22) Filed: Sep. 8, 2003

(65) Prior Publication Data

US 2005/0055300 A1 Mar. 10, 2005

(51) Int. Cl.
    *G06Q 40/00* (2006.01)
(52) U.S. Cl. ..................................... 705/36 R
(58) Field of Classification Search ............... 705/36 R
    See application file for complete search history.

(56) References Cited

U.S. PATENT DOCUMENTS

| | | | |
|---|---|---|---|
| 5,812,987 A | 9/1998 | Luskin et al. | |
| 5,812,988 A | 9/1998 | Sandretto | |
| 5,819,237 A | 10/1998 | Garman | |
| 5,893,079 A * | 4/1999 | Cwenar ........................ | 705/36 R |
| 5,991,743 A | 11/1999 | Irving et al. | |
| 5,999,918 A | 12/1999 | Williams et al. | |
| 6,021,397 A | 2/2000 | Jones et al. | |
| 6,026,381 A | 2/2000 | Barton, III et al. | |
| 6,061,662 A | 5/2000 | Makivic | |
| 6,078,904 A | 6/2000 | Rebane | |
| 6,085,175 A | 7/2000 | Gugel et al. | |
| 6,249,775 B1 | 6/2001 | Freeman et al. | |
| 6,272,478 B1 * | 8/2001 | Obata et al. ..................... | 706/12 |
| 6,275,814 B1 | 8/2001 | Giansante et al. | |
| 6,820,069 B1 * | 11/2004 | Kogan et al. ..................... | 706/46 |
| 7,412,417 B1 * | 8/2008 | Tuttle .............................. | 705/38 |
| 2002/0059107 A1 * | 5/2002 | Reich et al. ..................... | 705/26 |
| 2002/0082979 A1 * | 6/2002 | Sands et al. ..................... | 705/37 |
| 2002/0198812 A1 * | 12/2002 | Wizon et al. .................... | 705/36 |
| 2003/0229581 A1 * | 12/2003 | Green et al. ..................... | 705/38 |

OTHER PUBLICATIONS (Friedman, Jack, Dictionary of Business Terms, 2000, Barron's Educational Series, Third Ed., p. 42).*
Jack P. Friedman, "Dictionary of Business Terms," 2000, 3rd Edition, p. 42.*

* cited by examiner

*Primary Examiner* — Jagdish N Patel
*Assistant Examiner* — Kenneth Bartley
(74) *Attorney, Agent, or Firm* — Edwards Angell Palmer & Dodge LLP

(57) ABSTRACT

A system and method for determining the buying power of an investment portfolio are disclosed which involve providing a set of compliance rules for an investment portfolio, receiving a request to analyze a proposed transaction, and calculating a transaction limit for the proposed transaction based upon the set of compliance rules.

8 Claims, 3 Drawing Sheets

SYSTEM AND METHOD FOR DETERMINING THE BUYING POWER OF AN INVESTMENT PORTFOLIO

BACKGROUND OF THE INVENTION

1. Field of the Invention

The subject invention is directed to a system and method for determining the buying power of an investment portfolio, and more particularly, to a system and method of determining a purchasing limit for a proposed transaction involving a financial instrument.

2. Background of the Related Art

Investment managers, and in particular, those who are responsible for managing the portfolios of large institutional investors, buy and sell fixed income securities and equities, based upon the investment objectives set forth by the investors. For example, a particular institutional investor may wish to restrict certain types of assets from its portfolio. In such an instance, the investor may instruct its portfolio manager not to purchase corporate bonds or equities from certain corporations or industry sectors. Alternatively, a particular institutional investor may have the desire to limit a certain percentage of its assets under management to certain types of fixed income securities. For example, an institutional investor may designate that not more than five percent of its assets under management should be invested in agency-backed securities.

Investment objectives are generally conveyed from an investor to a portfolio manager in the form of a set of investment rules or guidelines. The investment rules are then used by the portfolio manager to develop compliance rules against which investment decisions or portfolios of investments are analyzed.

Compliance rules operate in two distinct ways. First, a compliance rule can affect a particular investment decision, such as the decision to purchase a large quantity of Treasury notes for inclusion in a particular portfolio. This decision could be governed by one or more compliance rules that would influence the decision before the investment is made. Such a rule is commonly referred to as a "front end" compliance rule. Alternatively, a compliance rule could affect the composition of a particular portfolio, such as by requiring a portfolio manger to sell a quantity of a particular type of fixed income security. For example, as a result of a change in interest rates, a compliance rule may be employed to instruct a portfolio manager to reduce the quantity of a certain class of Treasury notes within a particular portfolio. Such a compliance rule would affect the portfolio as a whole, rather than a particular investment decision, and is therefore commonly referred to as a "back end" compliance rule.

Compliance rules, whether related to front-end or back-end compliance, have been used by portfolio managers in computerized portfolio management systems. In the past, compliance rules set forth by institutional investors have been translated into computer readable statements. Such statements are then used to instruct a computer system to monitor investment decisions and the composition of portfolios as a whole, and to inform portfolio mangers whether particular investment decisions or portfolios of investments are in compliance with the investment objectives of particular investors. In this case, compliance rules are used to provide portfolio managers with information concerning purchasing limits for proposed transactions.

More particularly, prior to executing a trade involving a financial instrument, a portfolio manager will typically be interested in knowing the purchasing limit or buying power for a particular portfolio, or for a group of portfolios. That is, the portfolio manager would like to know how much of a particular financial instrument can be purchased for a given investment portfolio, without violating any compliance rules or limits, before the trade is executed. Without this information, a portfolio manager could enter a transaction request for a quantity of securities that may be in excess of a certain limit placed on the portfolio by the compliance guidelines. In such an instance, the portfolio manager would have to modify the transaction request so that it is acceptable. Without guidance from the system, this could take several attempts, making the task extremely inefficient. It would be beneficial therefore to provide a portfolio manager with transaction limit information, based upon compliance rules, prior to the execution of a trade to enable the manager to efficiently allocate available funds among one or more portfolios.

SUMMARY OF THE INVENTION

The subject invention is directed to a new and unique method of determining the buying power of an investment portfolio. The method basically includes the steps of providing a set of compliance rules for an investment portfolio, and applying the set of compliance rules to a proposed transaction to determine a transaction limit therefor. The proposed transaction preferably includes a financial instrument, and more preferably a fixed income security, such as, for example, Treasury bonds and notes, mortgage-backed securities, agency backed securities, etc. The compliance rules are generally based on portfolio guidelines defined by the investor and regulatory requirements imposed by a governmental entity.

In accordance with a preferred embodiment of the subject invention, the method includes the steps of providing a set of compliance rules for an investment portfolio, receiving a request to analyze a proposed transaction, and calculating a transaction limit for the proposed transaction based upon the set of compliance rules. Preferably, the step of calculating a transaction limit includes calculating a transaction limit for each compliance rule, and the method further comprises the step of sorting the compliance rules from most restrictive to least restrictive based upon the transaction limit calculated for each compliance rule. The method further includes the step of determining the buying power of the portfolio based upon the transaction limit associated with the most restrictive compliance rule. Preferably, the method further includes the step of determining whether the each compliance rule applies to the proposed transaction by testing each rule against the proposed transaction using a nominal transaction value, for example, one dollar. The invention further includes the step of determining that the buying power of the portfolio for the proposed transaction is zero if the nominal transaction value for the proposed transaction violates a compliance rule.

The subject invention is also directed to a system for determining the buying power of an investment portfolio. The system includes means for storing a set of compliance rules for an investment portfolio, means for receiving a request to analyze a proposed transaction, and means for calculating a transaction limit for the proposed transaction based upon the set of compliance rules. Preferably, the means for calculating a transaction limit is adapted and configured to calculate a transaction limit for each compliance rule, and the system further includes means for sorting the compliance rules from most restrictive to least restrictive based upon the transaction limit calculated for each compliance rule. Means are also provided for determining the buying power of the portfolio based upon the transaction limit associated with the most restrictive compliance rule. Additionally, the system includes means for determining whether each compliance rule applies to the proposed transaction, which means are adapted and configured to test each compliance rule against the proposed transaction using a nominal transaction value.

The subject invention is also directed to a method of determining the buying power of an investment portfolio that includes the steps of receiving a request to analyze a proposed transaction involving a security from a portfolio manager for a selected portfolio stored in a portfolio database, retrieving the selected portfolio from the portfolio database and accessing a set of compliance rules related to the selected portfolio from a rules database. The method further includes the steps of determining whether each compliance rule in the set of compliance rules related to the selected portfolio applies to the proposed transaction, calculating a transaction limit for the proposed transaction for each applicable compliance rule in the set of compliance rules and sorting each applicable compliance rule from most restrictive to least restrictive. The method further includes the step of specifying the buying power of the selected portfolio for the proposed transaction based on the transaction limit for the most restrictive of the applicable compliance rules.

These and other aspects of the system and method of the subject invention, including the ability to improve the buying power of a selected portfolio, will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the method and system of the present invention, embodiments thereof will be described in detail hereinbelow with reference to the drawings, wherein.

DETAILED DESCRIPTION OF PREFERRED EMBODIMENTS

Figure 1:
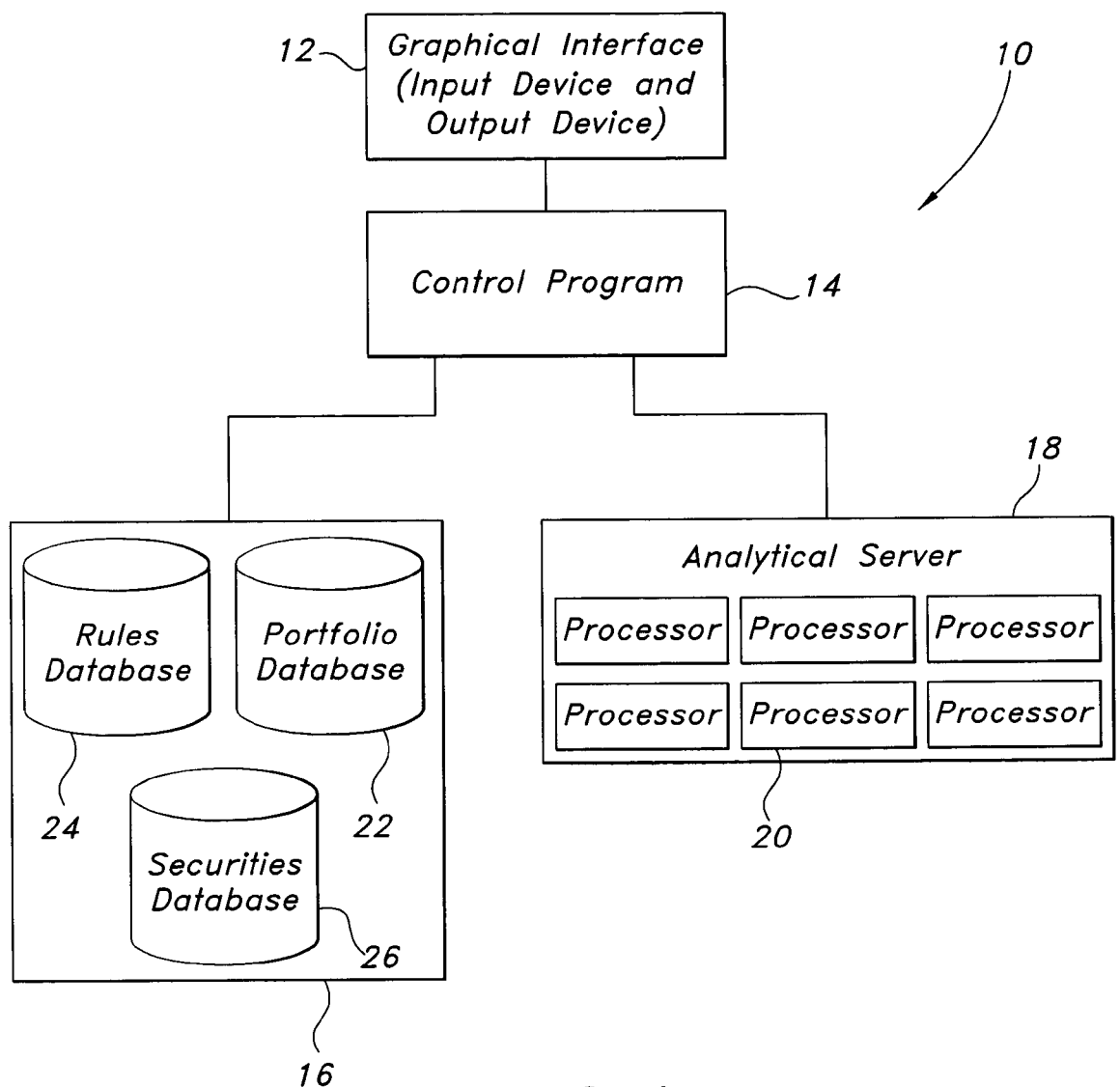
FIG. 1 is a schematic diagram depicting the core functional components of the portfolio management system of the subject invention.

Referring now to the drawings wherein like reference numerals identify similar elements or aspects of the system and method disclosed herein, there is illustrated in FIG. 1 a schematic representation of a computer-based portfolio management system constructed in accordance with a preferred embodiment of the present invention and designated generally by reference numeral 10. Portfolio management system 10 features trade entry and portfolio management tools and is integrated with compliance and risk management modules. As described below, system 10 includes software and hardware arranged in a distributed computing network, including programs, operating systems, memory storage devices, input/output devices, data processors, servers with links to data communication systems, wireless or otherwise, such as those which take the form of a local or wide area network, and a plurality of data transceivers within the network.

Referring to FIG. 1, portfolio management system 10 basically includes a graphical user interface 12 that interacts with a control program 14 associated with a data storage device or memory 16 and an analytical server 18 that comprises a plurality of processors 20. The graphical user interface 12 is a data input/output device that incorporates user-friendly features presented on a display screen in a framed form having borders, multiple folders, toolbars with pull-down menus, embedded links to other screens and various other selectable features associated with animated graphical representations of depressible buttons. These features can be selected (i.e., "clicked on") by the user via connected mouse, keyboard, and voice command or other commonly used tools for indicating a preference in a computerized graphical interface. The control program 14 contains an instruction set written in a conventional computing language such as HTML, C++ or Java, for coordinating the interactive relationship between graphical user interface 12, memory 16 and the processors 20 of analytical server 18.

In accordance with a preferred embodiment of the subject invention, the memory 16 contains a plurality of cooperative relational databases, including a portfolio database 22, a rules database 24 and a securities database 26. The portfolio database 22 stores a plurality of investment portfolios owned by individual or institutional investors. Each portfolio includes a plurality of investment products in the form of fixed income securities such as U.S. Treasury notes or bonds, municipal, corporate or agency bonds, mortgage backed securities or derivative instruments.

Rules database 24 stores a multiplicity of front-end and back-end compliance rules related to the portfolios stored in the portfolio database 22. The compliance rules may relate to, among other things, duration guidelines indicating a targeted duration for a portfolio, asset allocation guidelines setting forth eligible types of investments, credit agent criteria for financial instruments (e.g., ratings supplied by S&P or Moody's), restricted securities which may not be added to a portfolio and other investment practices. Securities database 26 maintains the identifying and descriptive information about a security, including, for example, original issuer information, coupon/factor data, put/call information, cash flow data and payment processing information.

Figure 2:
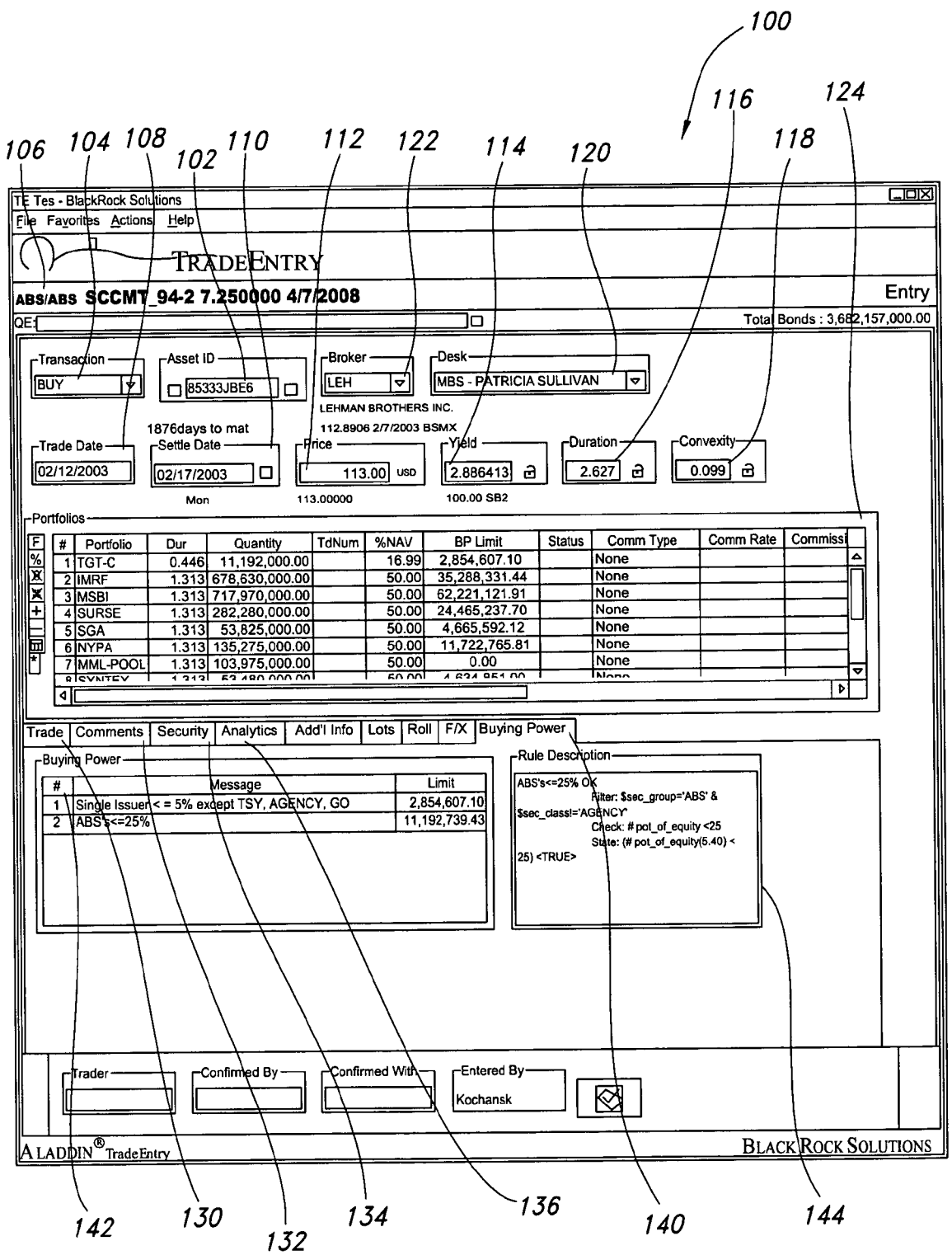
FIG. 2 is an illustration of a graphical display screen configured in accordance with a preferred embodiment of the subject invention.

Referring now to FIG. 2, there is illustrated a detailed illustration of a display screen of the graphical user interface 12 configured in accordance with a preferred embodiment of the subject invention and designated generally by reference numeral 100. Display screen 100 serves as the control panel or "dashboard" for the trade entry system of portfolio management system 10. The trade entry system, within which the "buying power" module of the subject invention is incorporated, is designed to maximize the quantity of information captured at trade time through the display screen 100 by adjusting for different security types and defaulting the value of certain data fields to minimize data input by portfolio managers.

The trade entry system retrieves security information from the securities database 26 to populate the various field of display screen 100. For example, the following fields may be automatically populated with information from securities database 26 upon entry of the Asset ID or CUSIP in field 102 and transaction type in field 104: security description (name, coupon and maturity date) in field 106; trade date in field 108; settlement date (defaults to convention based on security type) in field 110; price, yield, duration and convexity (defaults to previous end of day) in fields 112, 114, 116 and 118, respectively; trading desk and broker in fields 120 and 122, respectively. It is envisioned that display screen 100 could be modified to present additional information stored in the securities database 26, including, for example, factor, principal, interest, net money, and current par.

With continuing reference to FIG. 2, display screen 100 includes a portfolios table 124 containing information relating to portfolios stored in database 22 such as the portfolio name, duration, trade quantity, trade number, % NAV, buying power limit "BP Limit" and trade status, as well as commission information. Display screen 100 also provides access to several drop down boxes through a set of horizontally disposed click tabs spread across the viewing screen. For example, click tab 130 provides access to trade information, click tab 132 provides access to comments entered by a user, click tabs 134 and 136 provide access to information relating to security and analytics. Click tab 140 provides access to information concerning the "buying power" of a selected portfolio. In accordance with the subject invention, the buying power module enables a portfolio manager to determine a dollar limit or quantity for a proposed transaction involving a security using the compliance guidelines stored in the rules database 24 for a selected portfolio or group of portfolios stored in portfolio database 22.

The buying power selection tab 140 opens a list box 142 that displays buying power information including a sorted list of compliance rules from rules database 24 which affect the buying power of a selected portfolio and the purchasing limit in dollars established by the rule. A rule description box 144 is located adjacent to the buying power message box 142 under buying power tab 140 that provides the detailed character strings that define each of the applicable compliance rules set forth in message box 142 to enable the portfolio manager to better understand the basis for the compliance rule.

Figure 3:
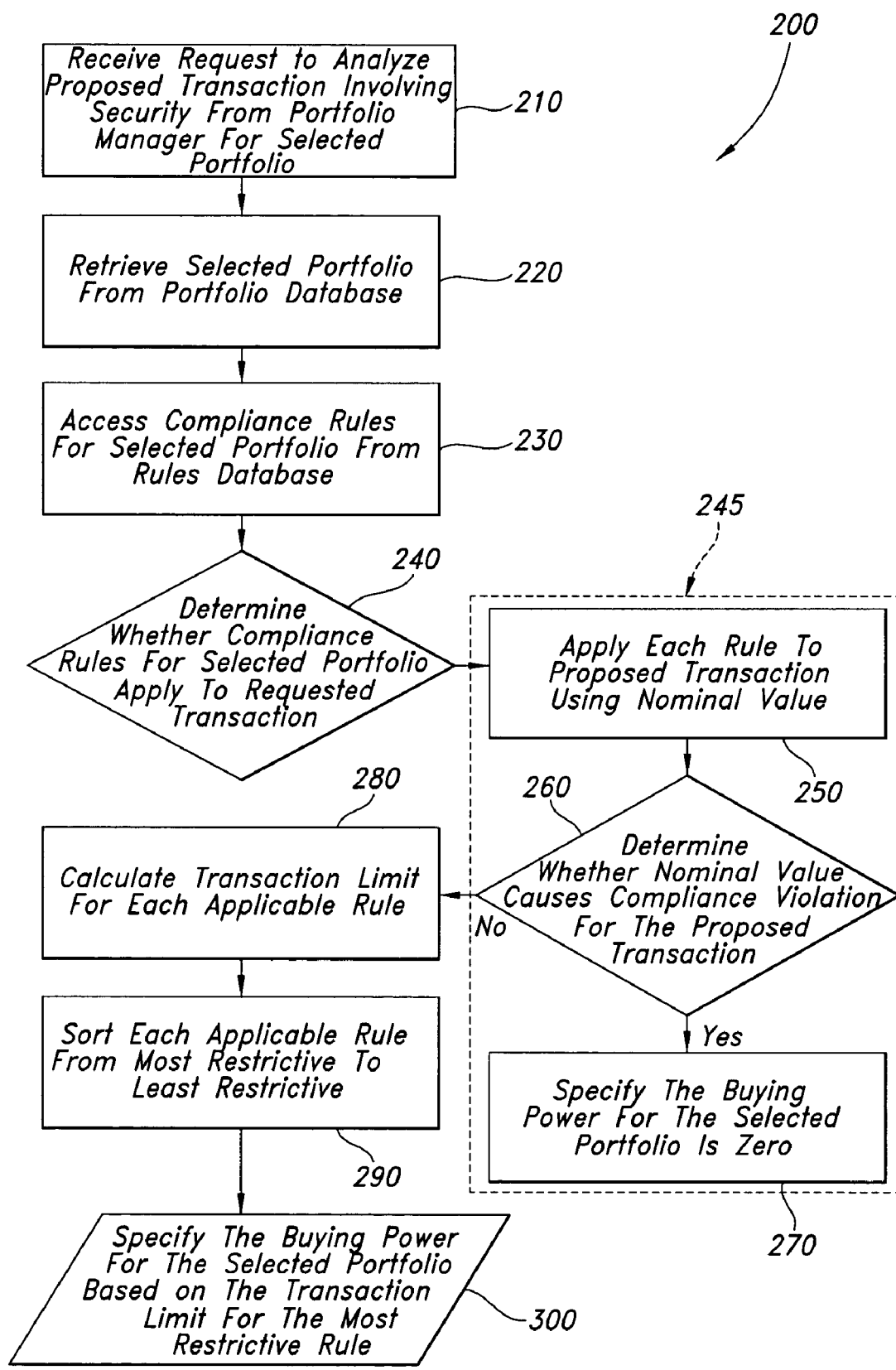
FIG. 3 is a process flow chart illustrating the iterative steps of a method configured in accordance with a preferred embodiment of the subject invention.

Referring now to FIG. 3, there is illustrated a process flow chart 200 depicting the iterative steps employed by the system to determine the buying power of a selected portfolio or group of portfolios in accordance with a preferred embodiment of the subject invention. In describing the process steps of flow chart 200, reference will be made to the data presented in display screen 100 of FIG. 2. Initially, at step 210, the system receives a request to analyze a proposed transaction from a portfolio manager involving a fixed income security for a selected portfolio stored in database 22, often referred to as a "what if" scenario analysis. For example, as shown in FIG. 2, the portfolio manager enters a proposed buy request in field 104 for an asset backed security "ABS" referred to as "SCCMT_94-2" in field 106 with an Asset ID designated in field 102 as "85333JBE6" in the amount of 11,192,000, for inclusion in a portfolio called "TGT-C". The transaction amount is presented in the quantity column of portfolios table 124. At such a time, the default fields of display screen 100 are populated with information from securities database 26, including a price of $113.00, a yield of 2.886%, a duration of 2.627 and a convexity of 0.099, as displayed in fields 112, 114, 116 and 118, respectively.

At step 220, the system retrieves the selected portfolio from portfolio database 22 for use in the buying power calculation/determination. Then, at step 230, the system accesses rules database 24 to retrieve the compliance rules associated with the selected portfolio. As shown in FIG. 2, there are two compliance rules in message box 142 related to portfolio TGT-C. The first compliance rule relates to single issuer allocation, and more particularly, provides that securities from a single issuer must be less than or equal to 5% of the total value of the portfolio, unless the security is a Treasury, Agency or Government security. The second rule relates to sector allocation, and more particularly, provides that the value of asset backed securities must be less than or equal to 25% of the total value of the portfolio.

At step 240, the system determines whether the compliance rules for the selected portfolio apply to the proposed transaction. More particularly, the system runs a subroutine 245, which, at step 250, applies each compliance rule associated with the selected portfolio to the proposed transaction using a nominal value, e.g., one dollar. At step 260, the system determines whether the proposed transaction would violate a compliance violation based on the nominal transaction value. If there is a compliance violation using the nominal value, the system will indicate that the buying power of the selected portfolio for the proposed transaction is zero at step 270. Alternatively, if each of the compliance rules associated with the selected portfolio are not violated by the proposed transaction and thus are applicable thereto, the system advances to step 280 to calculate the transaction limit for each applicable rule.

The methodology employed to calculate a transaction limit will vary depending upon the type of compliance rule. For example, if appropriate, the system can conduct an iterative hunt and peck routine, whereby after testing the nominal value against a compliance rule, the proposed transaction will be applied against the compliance rule using a value equal to the total available asset value of the selected portfolio. If that test does not result in a violation, then there would be no limit for the proposed transaction. Alternatively, if the total asset value test described above results in a compliance violation, the system will incrementally change the test value until the transaction limit is approached and obtained.

In other instances, where appropriate, the transaction limit can be calculated based on a percentage of the total asset value of a portfolio. For example, referring to FIG. 2, the transaction limit for the single issuer allocation rule is $2,854,607.10. That is, based on the total asset value of portfolio TGT-C, no more than $2,854,607.10 of the analyzed asset backed security SCCMT_94-2 can be added to the selected portfolio TGT-C. Similarly, the transaction limit for the sector allocation rule is $11,192,739.43. Thus, based on the total asset value of portfolio TGT-C, no more than $11,192,739.43 of the asset backed security SCCMT_94-2 can be added to the selected portfolio TGT-C.

After the transaction limits for each applicable compliance rule are calculated at step 280, the applicable compliance rules are sorted at step 290 in order from most restrictive to least restrictive based on transaction limits. Thus, as shown in message box 142, the single issuer allocation rule is more restrictive than the sector allocation rule. This is apparent in the fact that the transaction limit for the single issuer allocation rule is less than the transaction limit for the sector allocation rule.

Finally, at step 300, the system specifies the buying power for the selected portfolio based on the transaction limit for the most restrictive rule. In this case, as shown in the portfolios table 124, the buying power for portfolio TGT-C, with respect to the proposed transaction involving the asset backed security SCCMT_94-2, is $2,854,607.10, which is the transaction limit for the most restrictive compliance rule shown in message box 142.

Once the portfolio manager determines the buying power for the portfolio with respect to the proposed transaction, the transaction may be executed though the trade entry system if that is desired. However, if the portfolio manager desires to increase the buying power of the portfolio for the proposed transaction, they can use the information provided by message box 142 and rules description box 144 to obtain an in depth understanding of the basis for the buying power determination. For example, the sector allocation rule description presented in box 144 indicates that in its current state, 5.4% of the total asset value of portfolio TGT-C is represented by asset backed securities, making the transaction limit 19.6% of the total asset value of the portfolio. Thus, using the rules descriptions, the portfolio manager can see why the transaction limit was calculated, which would allow them to identify alternative opportunities and decide what actions to take, so as to maximize the quantity of the analyzed security that can be purchased. The information will enable the portfolio manager to modify or adjust the composition of the portfolio to increase buying power for the desired transaction.

For example, in the case of the proposed transaction illustrated in FIG. 2, if the selected portfolio contained less desirable SCCMT securities of a different rate and maturity than the more desirable SCCMT_94-2 securities targeted by the proposed transaction, the portfolio manager could sell the less desirable securities to increase the buying power of the portfolio for the more desirable securities. Similarly, if the more restrictive rule was a sector allocation rule, the portfolio manager could sell off less desirable securities within the restricted sector to make room for more desirable securities, thereby increasing the buying power of the portfolio.

Although the system and method of the subject invention have been described with respect to preferred embodiments, those skilled in the art will readily appreciate that changes and modifications may be made thereto without departing from the spirit and scope of the subject invention as defined by the appended claims.

What is claimed is:

1. A computer implemented method of determining a buying power of an investment portfolio for a given security, the method comprising the steps of:
   a) storing a set of compliance rules in a database, each of the compliance rules defining a limit on an amount of shares of the security that can be added to the investment portfolio based on predetermined criteria;
   b) calculating a transaction limit for a proposed transaction involving the security for each compliance rule in the set of compliance rules;
   c) sorting the set of compliance rules from most restrictive to least restrictive based on the calculated transaction limit for each compliance rule, wherein the most restrictive compliance rule has a lowest transaction limit and the least restrictive compliance rule has a highest transaction limit, and wherein the steps of calculating the transaction limit and sorting the set of compliance rules are performed by an analytical server;
   d) displaying a buying power message box on an output device, wherein the buying power message box displays the sorted set of compliance rules and the calculated transaction limit for each rule; and
   e) displaying a rule description box on the output device with the buying power message box, wherein the rule description box defines how the transaction limit was calculated.

2. The method according to claim 1, further comprising using the analytical server to test each compliance rule against the proposed transaction using a nominal transaction value.

3. A method according to claim 2, further comprising the step of using the analytical server to determine that the buying power of the portfolio for the proposed transaction is zero if the nominal transaction value for the proposed transaction violates a compliance rule.

4. The method of claim 1, wherein the predetermined criteria include at least one of duration guidelines, asset allocation guidelines, credit ratings, and restricted security lists.

5. A computer implemented method of determining a buying power of an investment portfolio comprising the steps of:
   a) receiving a request to analyze a proposed transaction involving a security from a portfolio manager for a selected portfolio stored in a portfolio database;
   b) retrieving the selected portfolio from the portfolio database;
   c) accessing a set of compliance rules related to the selected portfolio from a rules database;
   d) determining whether each compliance rule in the set of compliance rules related to the selected portfolio applies to the proposed transaction;
   e) calculating a transaction limit for the proposed transaction for each applicable compliance rule in the set of compliance rules;
   f) sorting each applicable compliance rule from most restrictive to least restrictive based on the calculated transaction limit;
   g) displaying the sorted applicable compliance rules and the calculated transaction limit for each rule;
   h) calculating the buying power of the selected portfolio for the proposed transaction, wherein the buying power is equal to the transaction limit for the most restrictive of the applicable compliance rules; and
   i) displaying a name of the selected portfolio and its associated buying power for the proposed transaction involving the security; and
   j) displaying a rule description defining how the transaction limit was calculated;
   k) wherein each of the above steps is performed using a computer.

6. A method according to claim 5, wherein the step of determining whether each compliance rule in the set of compliance rules applies to the proposed transaction includes testing each compliance rule against the proposed transaction using a nominal transaction value.

7. A method according to claim 6, further comprising the step of determining that the buying power of the selected portfolio for the proposed transaction is zero if the nominal transaction value violates a compliance rule related to the selected portfolio.

8. A system for facilitating trade entry and portfolio management, the system comprising:
   a) a user interface interacting with a control program, a data storage device, and a processor;
   b) a financial security section of the user interface displaying a name of a security as well as data associated with the security;
   c) a portfolios section of the user interface displaying data retrieved from the data storage device, the data including a selectable list of investment portfolios and a buying power limit for the security associated with each of the investment portfolios; and
   d) a buying power module of the user interface displaying a list of compliance rules retrieved from the data storage device and a transaction limit calculated by the processor, the transaction limit being associated with each compliance rule, wherein the compliance rules and associated transaction limits are listed from lowest transaction limit to highest transaction limit and are applicable to a currently selected investment portfolio in the portfolios section of the user interface; and
   e) a rule description section of the user interface displaying how the transaction limit was calculated.

* * * * *